April 10, 1951    E. J. SLATTERY    2,547,983
COLLAPSIBLE HOSE COUPLING
Filed Sept. 24, 1947
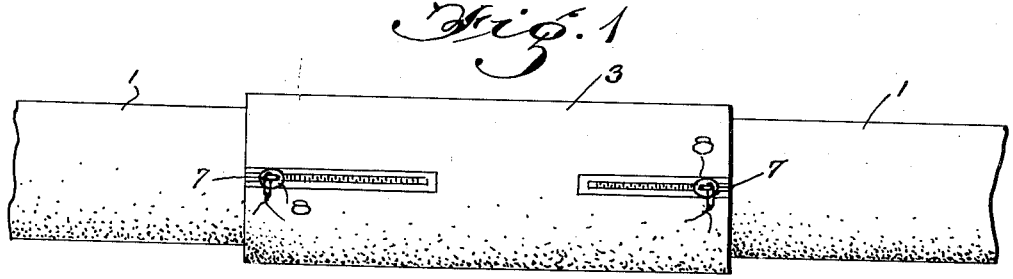
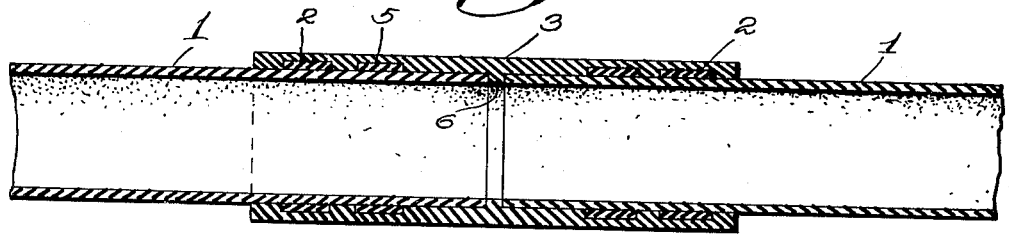
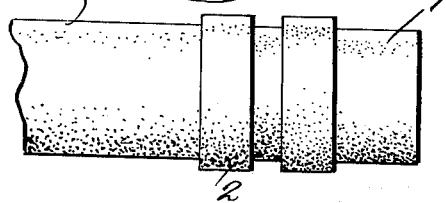
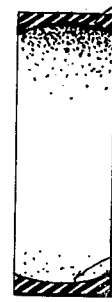
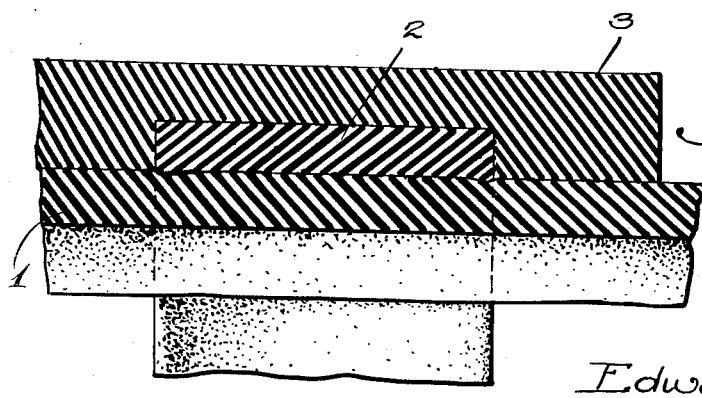
INVENTOR.
Edward J. Slattery
BY
W. J. Eccleston,
ATTORNEY Patented Apr. 10, 1951

2,547,983

UNITED STATES PATENT OFFICE 2,547,983

COLLAPSIBLE HOSE COUPLING

Edward J. Slattery, Washington, D. C.

Application September 24, 1947, Serial No. 775,820

12 Claims. (Cl. 285—71)

(Granted under the act of March 3, 1883, as amended April 30, 1928; 370 O. G. 757)

The invention described herein, if patented, may be manufactured and used by or for the Government for governmental purposes without the payment to me of any royalty thereon.

This invention relates to a collapsible hose coupling, and has for its primary object to provide such a coupling capable of use with a collapsible hose whereby the entire assembly of hose sections and couplings may be collapsed when the hose is wound upon a reel, thus avoiding the formation of unsightly lumps while at the same time providing additional storage space and preventing the possibility of damage to the hose.

Another object of the invention resides in the provision of a collapsible coupling for collapsible hose so designed as to permit of its ready application to hose sections without the use of tools and with a minimum of time and labor.

A still further object of the invention consists in the provision of a collapsible hose coupling which will grip the hose sections with increasing tenacity as the pressure in the hose is increased, thereby avoiding the possibility of accidental detachment of hose sections under ordinary pressures and working conditions.

Other objects and advantages of the invention will be apparent from the following description when taken in connection with the accompanying drawings, in which Figure 1 is a plan view of the novel collapsible joint;

Figure 2 is a horizontal section through the joint;

Figure 3 is an elevational view of one end of a hose section with the novel anchoring means mounted thereon;

Figure 4 is a sectional view through one of the anchoring means; and

Figure 5 is an enlarged sectional detail view showing one of the rings in relation with the other elements of the joint.

As hereinbefore indicated, the present invention is directed to a collapsible joint for collapsible hose sections, whereby the joint may be collapsed when the collapsed hose is wound upon a storage reel or the like. To this end, the invention comprises collapsible anchoring means applied to the exterior of the adjacent ends of the hose sections to be coupled together in combination with a coupling member for cooperation with the anchoring means to maintain the hose sections in their proper cooperative relationship.

The hose sections, which may be formed of rubber or other flexible compositions, are indicated by the numeral 1, and the numeral 2 indicates the anchoring means comprising rings of rubber or other flexible material which are mounted on the exterior surfaces of the hose sections. The coupling member, which connects with and envelops the anchoring means, is indicated by the numeral 3.

The flexible and collapsible rings 2 are shown as formed with a rounded or concaved inner surface 4, the purpose of which is to improve the binding or frictional action of the ring when mounted upon its hose section. The smallest internal diameters of the ring 2 are at the two edges of the ring, and these diameters are somewhat less than the external diameter of the respective hose section so that when the ring is forced over the hose section it will be caused to grip its surface tightly.

In the present instance, two of these rings are shown as applied to each hose section, and the coupling member 3 is provided adjacent each of its ends with a pair of internal annular grooves 5 which are adapted to engage over the rings 2, and of course are spaced apart to correspond with the spacings of the rings 2 upon the hose sections. The depths of the grooves 5 are somewhat less than the maximum thickness of the material of the rings 2, and consequently the coupling member forces the rings into tight engagement with the surface of the hose sections.

At its mid-point the coupling member 3 is provided with an internal rib 6, and as indicated in Figure 2 the ends of the hose sections tightly abut the side edges of the rib and the inner surfaces of the hose sections are flush with the inner surface of the rib so as to avoid any obstructions within the coupling. In order that the coupling 3 may be conveniently placed over the adjacent ends of the hose sections and the anchoring means or rings applied to the hose sections, the coupling member is provided with a slit 7 at each end, and these slits may each extend inwardly for about one-third the length of the coupling. Zipper fasteners 8 are provided for opening and closing these slits as desired.

In the operation of this collapsible joint or coupling, the anchoring rings 2 are first forced over the adjacent ends of the hose sections to be coupled and are properly spaced thereon so as to cooperate with the internal grooves 5 in the coupling 3. Thereafter, the coupling member 3 is brought into position and the ends of the hose sections placed therein so that their ends abut the side walls of the rib 6. This operation takes place, of course, while the zipper fasteners 8 are in open position, thereby facilitating the proper placing of the coupling member. After the hose sections are thus positioned, the zippers 8 are operated to close the slits and cause the coupling member to engage snugly over the rings 2 and force their inner surfaces into tight engagement with the outer surfaces of the hose sections.

With this construction, it will be apparent to those skilled in the art that the hose sections are tightly coupled without the use of any rigid parts; that the joint therefore may be collapsed when the hose itself is collapsed; that relatively few and inexpensive parts are necessary; and that upon the rupturing or breaking of a hose it may be readily repaired by squaring off the ends at the broken portion, applying one or more rings 2 to each section, and thereafter applying the coupling member 3 in the manner hereinbefore indicated.

While I have shown and described herein a preferred embodiment of the invention, the present disclosure is intended to be illustrative of the invention rather than limitative, and the scope of the invention is to be measured by the appended claims.

I claim:

1. A collapsible joint for collapsible hose sections, comprising one or more collapsible rings secured to the exterior of each of the adjacent ends of a pair of hose sections, and a flexible coupling member engaged over said rings.

2. A collapsible joint for collapsible hose sections, comprising one or more collapsible rings secured to the exterior of each of the adjacent ends of a pair of hose sections, and a flexible coupling member provided with internal annular grooves engaged over said rings.

3. A collapsible joint for collapsible hose sections, comprising one or more collapsible rings frictionally secured to the exterior surface of each of the adjacent ends of a pair of hose sections, and a flexible coupling member provided with internal grooves engaged over said rings.

4. A collapsible joint for collapsible hose sections, comprising one or more rings of lesser internal diameter than the exterior diameter of the hose section frictionally secured to each of the adjacent ends of the hose sections, and a flexible coupling member engaged over said rings.

5. A collapsible joint for collapsible hose sections, comprising one or more collapsible rings mounted on the exterior of each of the adjacent ends of a pair of hose sections, the inner surface of each ring being transversely curved and the maximum diameter of the inner surface being substantially that of the exterior diameter of the hose section, and a flexible coupling member engaged over said rings.

6. A collapsible joint for collapsible hose sections, comprising one or more collapsible rings frictionally secured to each of the adjacent ends of a pair of hose sections, and a flexible tubular coupling member engaged over said rings, said tubular member provided with elongated slits extending from each end toward the middle of the tubular member, and a zipper closure for each slit.

7. A collapsible joint for collapsible hose sections, comprising one or more collapsible rings frictionally secured to each of the adjacent ends of a pair of hose sections, a flexible tubular coupling member engaged over said rings, and an internal annular rib on said tubular member in abutting relation with the adjacent ends of the hose sections.

8. A collapsible joint for collapsible hose sections, comprising one or more collapsible rings each provided with an interior gripping surface mounted on each of the adjacent ends of a pair of hose sections, and a flexible tubular coupling member engaged over said rings.

9. In a collapsible joint for collapsible hose sections, a collapsible ring for engaging over one of the sections, the interior of said ring being of varying diameter but having at least a portion which is of less diameter than the external diameter of the hose section with which it is to cooperate.

10. In a collapsible joint for collapsible hose sections, a collapsible ring for engaging over one of the sections, the inner surface of said ring concaved, at least a portion of the ring having an internal diameter less than the external diameter of the hose section with which it is to cooperate.

11. In a collapsible joint for collapsible hose sections, a flexible tubular coupling member formed of rubber or the like, said coupling provided adjacent each end with one or more internal annular grooves.

12. In a collapsible joint for collapsible hose sections, a flexible tubular coupling member formed of rubber or the like, said coupling provided adjacent each end with one or more internal annular grooves, and with an elongated slit extending from each end of the member to a point beyond said groove or grooves, and means for closing said slits.

EDWARD J. SLATTERY.

REFERENCES CITED

The following references are of record in the file of this patent:

UNITED STATES PATENTS

| Number | Name | Date |
|---|---|---|
| 654,073 | Olinger | July 17, 1900 |
| 683,312 | Marquardt | Sept. 24, 1901 |
| 1,484,355 | Moir | Feb. 19, 1924 |
| 1,671,161 | Perks | May 29, 1928 |
| 2,329,490 | Smith | Sept. 14, 1943 |
| 2,346,051 | Seamark | Apr. 4, 1944 |
| 2,403,839 | Adolph | July 9, 1946 |